US011256910B2

(12) United States Patent
Roth et al.

(10) Patent No.: US 11,256,910 B2
(45) Date of Patent: Feb. 22, 2022

(54) METHOD AND SYSTEM FOR LOCATING AN OCCUPANT

(71) Applicant: POINTGRAB LTD., Hod Hasharon (IL)

(72) Inventors: Itamar Roth, Tel-Aviv (IL); Yonatan Hyatt, Tel-Aviv (IL); David Ungarish, Tivon (IL)

(73) Assignee: POINTGRAB LTD., Hod Hasharon (IL)

( * ) Notice: Subject to any disclaimer, the term of this patent is extended or adjusted under 35 U.S.C. 154(b) by 0 days.

(21) Appl. No.: 16/926,885

(22) Filed: Jul. 13, 2020

(65) Prior Publication Data

US 2020/0410226 A1   Dec. 31, 2020

Related U.S. Application Data

(63) Continuation-in-part of application No. 15/924,542, filed on Mar. 19, 2018, now abandoned.

(30) Foreign Application Priority Data

Mar. 19, 2017  (IL) .......................................... 251265

(51) Int. Cl.
*G06K 9/00*  (2006.01)
(52) U.S. Cl.
CPC ..... *G06K 9/00369* (2013.01); *G06K 9/00342* (2013.01); *G06K 9/00771* (2013.01); *G06K 9/00288* (2013.01)

(58) Field of Classification Search
None
See application file for complete search history.

(56) References Cited

U.S. PATENT DOCUMENTS

| | | | | |
|---|---|---|---|---|
| 6,690,374 | B2* | 2/2004 | Park | G08B 13/19641 345/427 |
| 9,886,624 | B1* | 2/2018 | Marty | G06K 9/00724 |
| 9,996,554 | B2* | 6/2018 | Yano | G06F 16/583 |
| 10,010,778 | B2* | 7/2018 | Marty | A63B 71/06 |
| 10,026,003 | B2* | 7/2018 | Houri | G06K 9/00771 |
| 10,078,693 | B2* | 9/2018 | Brown | G06F 16/784 |
| 2007/0294207 | A1* | 12/2007 | Brown | G06F 16/7335 |
| 2015/0154472 | A1* | 6/2015 | Yano | G06F 16/583 382/219 |
| 2017/0262725 | A1* | 9/2017 | Houri | G06K 9/00771 |
| 2018/0088777 | A1* | 3/2018 | Daze | G06F 3/0488 |
| 2018/0089501 | A1* | 3/2018 | Terekhov | G06K 9/00288 |
| 2018/0099201 | A1* | 4/2018 | Marty | G06K 9/00724 |
| 2020/0193619 | A1* | 6/2020 | Danielsson | G06T 7/292 |
| 2021/0056365 | A1* | 2/2021 | Sivan | G06T 7/277 |

* cited by examiner

*Primary Examiner* — Feng Niu
(74) *Attorney, Agent, or Firm* — Alphapatent Associates, Ltd; Daniel J. Swirsky

(57) ABSTRACT

An object is tracked in images of the space. A unique identification is assigned to the object and the uniquely identified object may then be located within the space based on the tracking of the object, without having to again uniquely identify the object.

15 Claims, 9 Drawing Sheets

METHOD AND SYSTEM FOR LOCATING AN OCCUPANT

CROSS-REFERENCE TO RELATED APPLICATIONS

This application is a Continuation-in-Part application of U.S. patent application Ser. No. 15/924,542 filed Mar. 19, 2018, which claims the benefit of priority from Israel Patent Application No. 251265, filed Mar. 19, 2017, the disclosure of which is incorporated herein by reference.

FIELD

The present invention relates to the field of occupancy sensing. Specifically, the invention relates to locating a specific occupant in a space.

BACKGROUND

Tracking and monitoring people are used in a variety of settings by military, civil, and commercial users, for example, by authorities for safety and security applications or by companies for tracking company employees.

Most tracking and monitoring methods use GPS to track devices, a common example of such devices being cellular phones. Such tracking methods do not directly track a person but rather track a device associated with a particular person.

Algorithms for detecting people in images are being developed and may be used to track people rather than devices associated with people. However, determining that a moving object in an image is a person and more so determining the identity of a moving person is a difficult task which largely depends on the angle of view of the cameras and other aspects of the setup of the space being monitored by the cameras. Existing people detecting and/or tracking solutions, although enabling to identify a person in a single image, do not enable continuous tracking of an identified person, especially in complex real world scenes that commonly involve multiple people, occlusions, and cluttered or moving backgrounds.

Thus, using people detecting algorithms to track and monitor specific people's locations from images is, to date, greatly limited.

SUMMARY

Methods and systems according to embodiments of the invention enable to locate a particular person within a monitored space. More so, embodiments of the invention enable locating a particular person within a monitored space without transmitting images of the space, thereby protecting privacy of occupants in the space.

In one embodiment of the invention an object in an image is initially identified as a particular occupant in a space, after which the object is tracked in images of the space. The particular identified occupant may then be located within the space based on the tracking of the object, without having to again identify the particular occupant or validate the occupant's identity.

An identity of a particular occupant may be determined by means of image analysis or other means. In one embodiment of the invention an object representing an occupant is detected in an image of the space. The identity of the occupant is determined and a unique identity is then associated with the object in the image. Once a unique identity is associated with a particular object in an image, the object may be tagged or named. Thereafter a system of cameras may track the tagged or named object in images of the space thereby tracking an identified occupant without having to verify the identity of the occupant during the tracking.

Embodiments of the invention enable tracking a particular person (or other occupant) using cameras located at any desired angle or view point. Cameras may thus be positioned within a space, such as a building, based on considerations such esthetics or ease of use for building operators and not based on considerations relating to tracking of occupants.

In some embodiments, a method (and system for performing the method) for locating a person in a space includes obtaining images of the space from first and second cameras, determining that an object in an image obtained from the first camera is a person (e.g., by applying computer vision algorithms on the image) and assigning a unique identity to the object. The object is then tracked throughout images obtained from the first camera and the second camera and the person can be located within the space based on the tracking and based on the unique identity.

The unique identity can be assigned to the object based on image analysis of the images of the space. In other embodiments a signal initiated by the person is received and the unique identity is assigned based on the received signal.

In some embodiments the object is tracked using a descriptor associated with the object. A descriptor may include one or a combination of components, such as appearance characteristics, location of the object, size and/or shape features of the object, etc.

The method may include receiving information from the first camera and tracking the object in the images obtained from the second camera based on the information received from the first camera. A descriptor associated with an object, such as a person, in the images obtained from the first and second cameras, can be extracted or created from the received information. Descriptors of objects from two images may be compared by using a dynamic metric, to determine if the object in both images is the same, to enable accurate tracking of an occupant in a space.

Using a descriptor which includes a combination of components enables a broader range by which to uniquely identify each object and using a dynamic metric by which to compare the descriptors of objects in two different images, enables to adjust the comparison to different situations, providing higher accuracy in determining objects in two different images are the same object, thereby enabling more robust tracking of occupants within a space.

In some embodiments the method includes detecting a direction of motion of the object in images obtained from the first camera and tracking the object in images obtained by the second camera based on the detected direction.

In some embodiments the method includes tracking the object in the images obtained by the second camera based on shape features of the object detected in the images obtained by the first camera.

Embodiments of the invention enable assigning a unique identity to the object retroactively, e.g., after determining that the object is a person and/or after assigning the unique identity to the object. The unique identity may be assigned retroactively to the object in previously stored images, namely images stored prior to determining that the object is a person and/or after assigning the unique identity to the object.

BRIEF DESCRIPTION OF THE DRAWINGS

The invention will now be described in relation to certain examples and embodiments with reference to the following illustrative figures so that it may be more fully understood. In the drawings.

DETAILED DESCRIPTION

Embodiments of the invention provide a system and method for locating a particular occupant in a space based on initially identifying an occupant, assigning the occupant's identity to an object in an image of the space, the object representing the occupant, and then tracking the object through images of the space.

"Occupant" may refer to any pre-defined type of occupant such as a human and/or animal occupant or typically mobile objects such as cars or other vehicles.

In one embodiment a method for locating an occupant in a space includes receiving an occupant identity signal associated with an object in an image of a space. When the occupant identity signal is received, a unique identity is assigned to the object in the image of the space and, following the assigning of the unique identity to the object, the object is tracked in images of the space. A particular occupant may thus be located within the space based on the tracking of an object and based on the occupant identity signal associated with the object.

For example, a space such as a room or building may be imaged by one or more cameras. An occupant in the space, who may be represented by an object in an image, is identified as a particular occupant having a unique identity (e.g., occupant X) either actively by the occupant or by a sensor in the space. Once the occupant is identified an identity of the occupant is assigned to the object in the image and the object is now tagged as "occupant X". Once the object is tagged it is tracked (e.g., by using known object tracking algorithms) through images of the space. The tagged object may be tracked through a large space covered by a plurality of cameras, each camera imaging a space consecutive (possibly partially overlapping) to the space covered by a neighboring camera and each camera being capable of communicating with the other cameras regarding the location of the tagged object. Thus, at any given time the location of occupant X can be known based on the tracking of the tagged object.

In some embodiments an object is tracked through images of the space and a unique identity is assigned to the object retroactively, enabling to know the locations of occupant X in time periods prior to identifying occupant X.

Methods according to embodiments of the invention may be implemented in a system for locating an occupant (namely, a particular occupant) in a space. The system may include a tracking system to receive a signal from a sensor that detects a unique identity of an occupant. The occupant is represented by an object in an image of the space, and the tracking system receives a signal from the sensor when the unique identity of the occupant is detected and assigns the unique identity to the object in the image and may locate the identified occupant in the space based on tracking of the object.

Figure 1A:
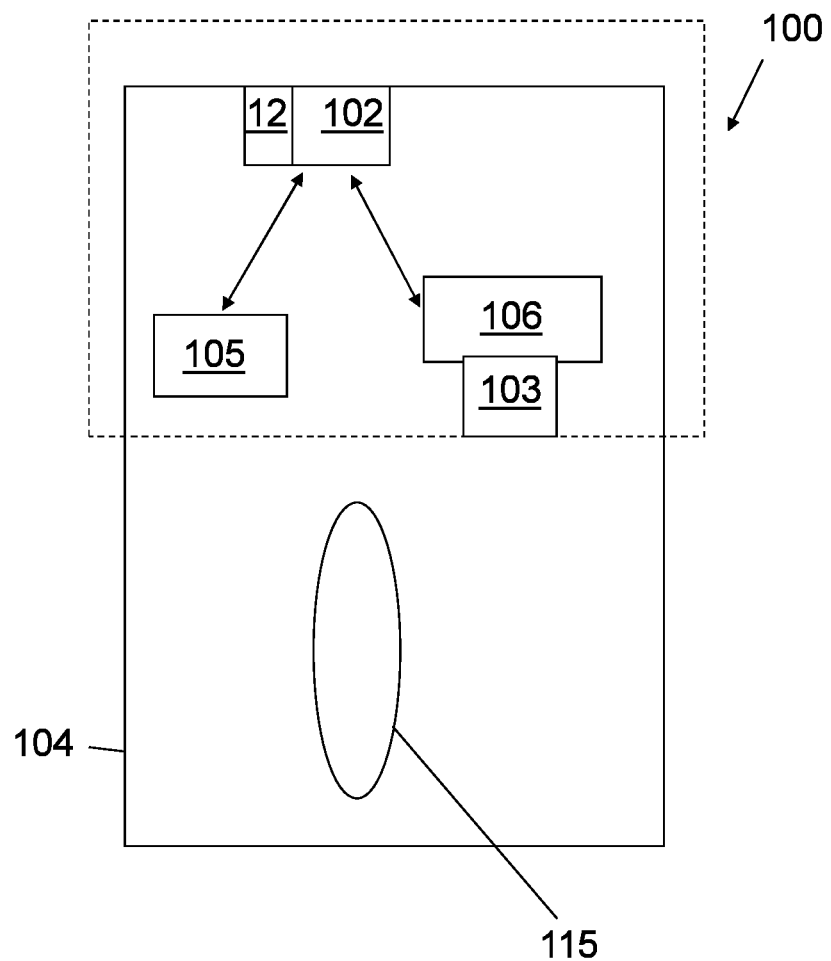
FIGS. 1A and 1B are schematic illustrations of systems according to embodiments of the invention.

An example of such a system is schematically illustrated in FIG. 1A.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," "extracting", "selecting" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment the system 100 may include a sensor unit 105 to detect a unique identity of an occupant and a tracking system 106 to receive a signal from the sensor unit 105, when the unique identity of the occupant is detected, and to assign the unique identity to an object representing the occupant in an image and to track the object in images of a space based on the detection of the unique identity.

In another embodiment, tracking system 106 receives a signal from the sensor unit 105 when the unique identity of the occupant is detected and assigns the unique identity to an object representing the occupant in an image. The system then locates the object in previous images to locate the occupant in a space retroactively, based on the detection of the unique identity.

The tracking system 106 may include one or more image sensor(s) or cameras such as camera 103. Sensor unit 105 and camera 103 may each have their own processor and memory and may communicate between them and/or be in communication with another processor. For example, both sensor unit 105 and camera 103 may be associated with a processor 102 and a memory 12.

In one embodiment the camera 103 is designed to obtain a top view of a space. For example, the camera 103 may be located on a ceiling of a room 104 (which is, for example, the space or part of the space to be monitored) to obtain a top view of the room or of part of the room 104.

In some embodiments sensor unit 105 includes an image sensor or camera. In some embodiments a single sensor may act both as a sensor unit to detect a unique identity of an occupant and as part of a tracking system to track the occupant in the monitored space.

A sensor unit 105 may include any suitable sensor for identification of occupants, e.g., a biometric sensor, an image sensor or a sensor for indirect identification such as by RF ID. Information from sensor unit 105 may be analyzed by a processor, e.g., processor 102.

In one embodiment sensor unit 105 includes a sensor to recognize a signal associated with an object 115 in an image of the room 104. The object 115 represents an occupant in the image.

Sensor unit 105 may be configured to detect or recognize a signal uniquely associated with the object 115, in one example, based on the occupant actively associating an ID signal with himself, for example, the sensor unit 105 may include an ID reader (such as an RF ID reader) which can detect an ID tag presented by the occupant to the sensor unit. Object 115, which is detected at the same time the ID tag was presented to the sensor unit and/or at a location where an occupant presenting an ID tag would be expected to be, is determined to represent the occupant presenting an ID tag. In another example the sensor unit 105 may include an image sensor for identification of an occupant based on face recognition, e.g., wherein the occupant directs his face at the imager so as to enable identification of the occupant. In this example object 115, which is detected at the same time and/or expected location of the facial recognition, is determined to represent the occupant whose face was recognized. In yet other examples the sensor unit 105 may include another suitable sensor for identification of occupants, e.g., a biometric sensor.

In some embodiments the sensor unit 105 includes another sensor, in addition to the sensor for identification of occupants, for example, a sensor to detect presence of a human, such as a motion detector e.g., a passive infrared (PIR) sensor (which, for example, is typically sensitive to a person's skin temperature through emitted black body radiation at mid-infrared wavelengths, in contrast to background objects at room temperature), a microwave sensor (which, for example, may detect motion through the principle of Doppler radar), an ultrasonic sensor (which, for example, emits an ultrasonic wave and reflections from nearby objects are received) or a tomographic motion detection system (which, for example, can sense disturbances to radio waves as they pass from node to node of a mesh network). Other known sensors may be used according to embodiments of the invention.

Once an occupant identity signal associated with an object in an image (e.g., object 115), is received, e.g., at processor 102, a unique identity is assigned to the object 115 in the image. In some embodiments the object 115 may be tagged based on receiving the occupant identity signal associated with object 115.

Following receiving the identity signal and the assigning of the unique identity to the object 115 (e.g., tagging the object), the object 115 is tracked in images of the space (e.g., room 104) by tracking system 106 and an occupant (represented by object 115) can be located in a space (e.g., room 104) by location the object 115. In some embodiments the object 115 is tracked in images of the space prior to receiving the identity signal. Once the identity signal is received and the unique identity is assigned to the object 115 (e.g., by tagging the object), the object 115 can be located in previously stored images of the space (e.g., room 104) and can be tagged retroactively so that the occupant (represented by object 115) can be located in a space based on the prior tracking of the object 115, before it was tagged.

Thus, a particular occupant, having been identified only once, may be located within a space at any time, based on the tracking and based on the identity signal.

Tracking system 106 typically tracks object 115 using one or more cameras 103. Image data obtained by the camera 103 is analyzed by a processor, e.g., processor 102. For example, image/video signal processing algorithms and/or image acquisition algorithms may be run by processor 102.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments image data may be stored by processor 102, for example, in memory 12. Processor 102 can apply image analysis algorithms, such as known shape detection algorithms in combination with methods according to embodiments of the invention to detect and track an occupant.

Figure 1B:
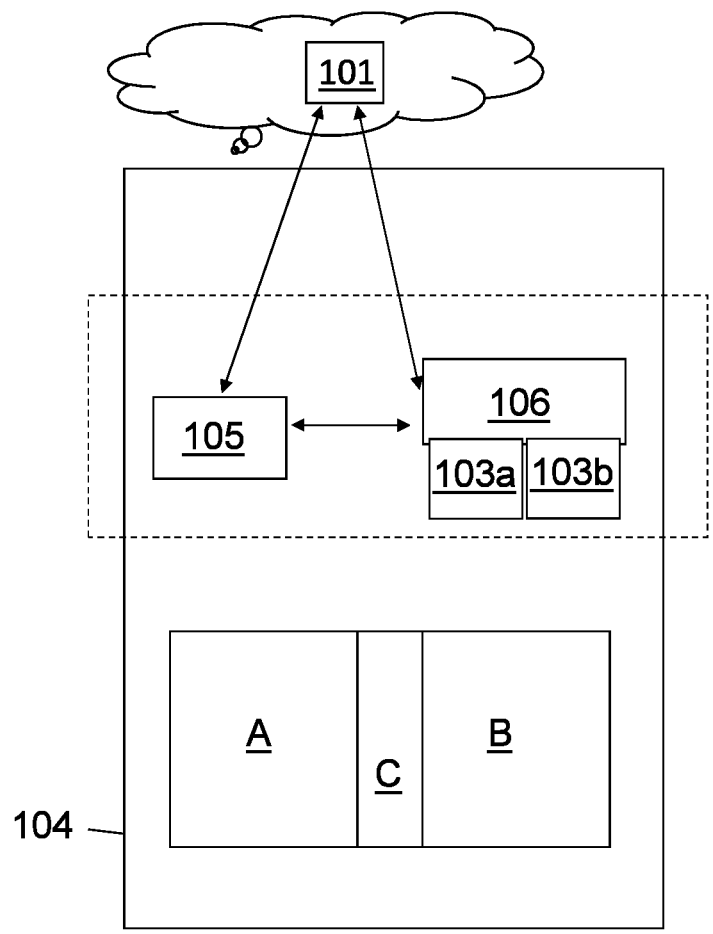

In one embodiment, which is schematically illustrated in FIG. 1B, the tracking system 106 includes a plurality of image sensors (e.g., cameras 103a and 103b) that can obtain image data from different portions of the space (e.g., room 104). Typically, neighboring cameras (e.g., cameras 103a and 103b) image consecutive portions or areas of the space (e.g., area A and area B) possibly with some overlap (e.g., overlap area C). The image sensors or cameras 103a and 103b may communicate with a processor, such as central processing unit 101, to accept and/or transfer information related to the imaged portions of the space. Through the processor (e.g., central processing unit 101) the plurality of cameras may accept and/or transfer information from one camera to another. Central processing unit 101 may store a location of each of the plurality of image sensors or cameras within the space. The locations of the cameras in the space together with the option of retroactively assigning a unique identity to objects may be used to provide a trajectory of the person in the space.

In one embodiment, information transmitted from one camera (e.g., 103a) to another camera (e.g., 103b) may include information relating to a tagged object 115, for example, direction information of the object (e.g., direction vectors of the object) motion information of the object, size parameters of the object or shape or appearance parameters of the object, etc. Thus, a unique identity may be assigned to an object imaged by first camera 103a and the object may be tagged. The tagged object may then be tracked by a processor associated with camera 103a while it is within the field of view (FOV) of camera 103a (typically including areas A and C). Information obtained from tracking the object within areas A and C may be relayed (e.g., through central processing unit 101) to a processor associated with camera 103b. This information may be used by the processor associated with camera 103b to detect the tagged object once the object enters the FOV of camera 103b (typically including areas B and C). Thus, a tagged object may be easily tracked throughout a large space.

In one embodiment the processor associated with the camera(s) 103 and/or with the sensor unit 105, such as processor 102, is in communication with the central processing unit 101. The central processing unit 101, which may be in a remote server, possibly cloud based, or local within system 100, may be used to monitor a space and to generate a location of the tagged object (and thus a location of the occupant associated with the tagged object) within the space. For example, output from central processing unit 101 may be used to issue reports about the number of occupants in a space and their location within the space or to alert a user to the presence of a specific occupant at a specific location.

The central processing unit 101 may be part of a central control unit of a building, such as known building automation systems (BAS) (provided for example by Siemens, Honeywell, Johnson Controls, ABB, Schneider Electric and IBM) or houses (for example the Insteon™ Hub or the Staples Connect™ Hub).

According to one embodiment, the camera(s) 103 and/or processor 102 are embedded within or otherwise affixed to a device such as an illumination or HVAC (heating, ventilation and air conditioning) unit, which may be controlled by central processing unit 101. In some embodiments the processor 102 may be integral to the camera(s) 103 or may be a separate unit. According to other embodiments a first processor may be integrated within the imager and a second processor may be integrated within a device.

In some embodiments, processor 102 may be remotely located. For example, a processor according to embodiments of the invention may be in a remote server or part of another system (e.g., a processor mostly dedicated to a system's Wi-Fi system or to a thermostat of a system or to LED control of a system, etc.).

The communication between the camera(s) 103 and processor 102 and/or between the processor and the central processing unit 101 may be through a wired connection (e.g., utilizing a USB or Ethernet port) or wireless link, such as through infrared (IR) communication, radio transmission, Bluetooth technology, ZigBee, Z-Wave and other suitable communication routes.

According to one embodiment the camera(s) 103 may include a CCD or CMOS or other appropriate image sensor and appropriate optics. The camera(s) 103 may include a standard 2D camera such as a webcam or other standard video capture device. A 3D camera or stereoscopic camera may also be used according to embodiments of the invention.

When discussed herein, a processor such as processor 102 and/or central processing unit 101, which may carry out all or part of a method as discussed herein, may be configured to carry out the method by, for example, being associated with or connected to a memory such as memory 12 storing code or software which, when executed by the processor, carry out the method.

Figure 2A:
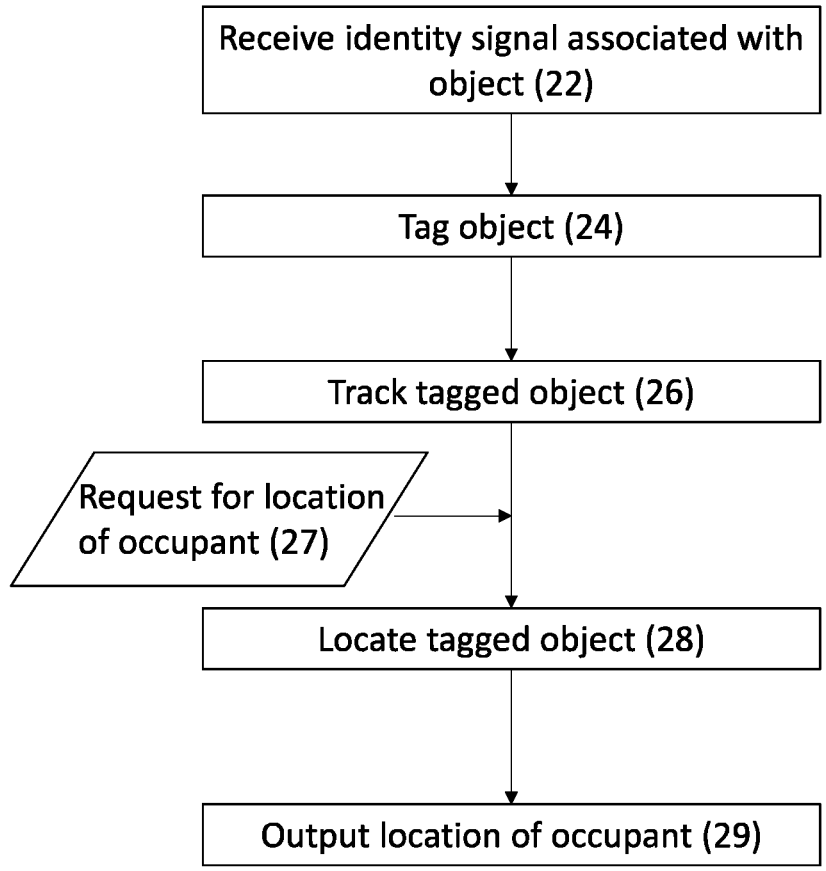
FIGS. 2A, 2B and 2C are schematic illustrations of methods for locating an occupant in a space, according to embodiments of the invention.
Figure 2B:
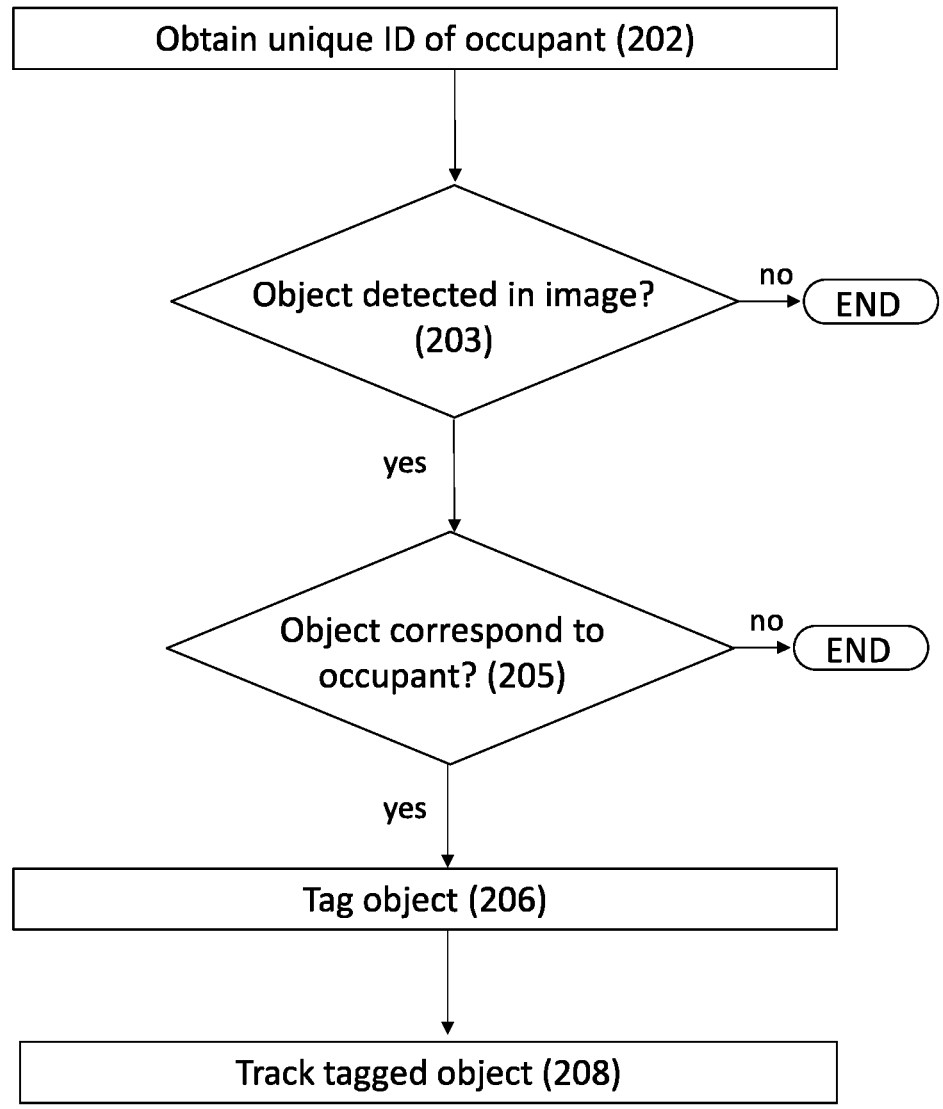

Methods for locating an occupant in a space, according to embodiments of the invention are schematically illustrated in FIGS. 2A and 2B.

In one embodiment, which is schematically illustrated in FIG. 2A, a method for locating an occupant in a space includes receiving an occupant identity signal associated with an object in an image of a space (22) and upon receiving the occupant identity signal, assigning a unique identity to the object in the image of the space (24), thereby tagging the object. The tagged object is now tracked in images of the space (26). An occupant may be located within the space based on the tracking and on the occupant identity signal. For example, upon request for location of an occupant (27) the tagged object, which corresponds to the requested occupant, is located (28) and the location of the occupant may be output (29) based on the location of the tagged object. Thus, a location of the occupant in the space may be provided upon demand.

In one embodiment, which is schematically illustrated in FIG. 2B, the method includes obtaining a unique identity of an occupant in a space (202). If an object is detected in images of the space (203) and if the object corresponds to the occupant (205) then assigning the unique identity to the detected object (206). Following the assigning of the unique identity to the object, the object is tracked in images of the space (208).

Figure 2C:
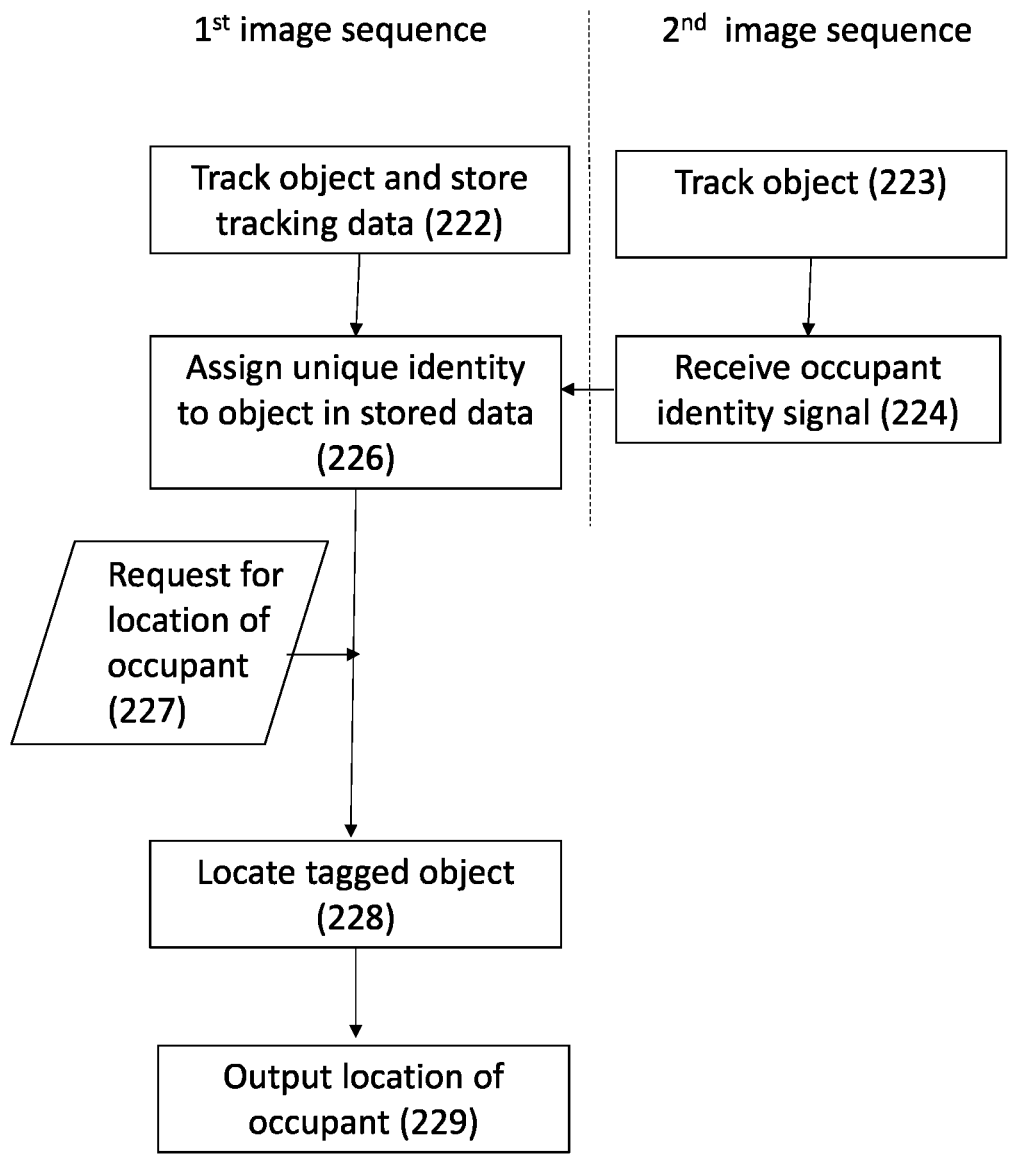

In one embodiment, which is schematically illustrated in FIG. 2C, the method includes tracking an object in a first sequence of images of a space and storing the tracking data (222). The object is then tracked in a second, typically later, sequence of images (223). Upon receiving an occupant identity signal associated with the object in an image from a second sequence of images (224), a unique identity is assigned to the object in the first sequence of images and is applied on the stored tracking data (226), thereby tagging the object retroactively in the first sequence of images and enabling to locate the object based on the occupant identity signal and based on the stored tracking data. Upon request for location of an occupant (227) the tagged object, which corresponds to the requested occupant, is located (228) in the first sequence of images based on the prior tracking of the object and the location of the occupant may be output (229). Thus, a location of the occupant in the space before or after identifying the object as a specific occupant, may be provided upon demand.

In one embodiment, determining if the object corresponds to the uniquely identified occupant may include identifying the object as an occupant prior to obtaining a unique identity of the occupant, for example, by identifying the object as a human or other type of occupant based on shape and/or motion information collected from images of the space and/or by using known human detecting algorithms.

Thus, in one embodiment, if an object is detected in images of the space and if the object is determined to be an occupant then the unique identity is assigned to the object.

Determining that the object corresponds to an occupant (e.g., has the shape or size of an occupant and/or shows a motion pattern typical of an occupant, etc.) can be done periodically throughout the tracking or at specific times (e.g., when the object initially appears in the FOV of one of the cameras of the tracking system (e.g., tracking system 106) or after a predetermined number of frames after the object initially appeared in the FOV), such that the occupant's full body is within the FOV of the camera and motion information can be collected from several frames.

In one embodiment, once an object is tagged it is tracked in images of the space. The object may be tracked in images of the space using known tracking techniques such as optical flow or other suitable methods.

In one embodiment, tracking the tagged object includes applying a computer vision algorithm on an image of the space to detect an image feature of the object (e.g., a facial feature, such as width of mouth, width of eyes, pupil to pupil, etc.) and tracking the image feature of the object. In other embodiments an image feature includes an appearance characteristic which is a feature that differentiates the object from its background and other objects. Appearance characteristics may be based on image data but they cannot be used to reconstruct an image. Examples of such appearance characteristics may include statistical representations of pixel values (e.g., histograms, mean values of pixels, etc.).

In another embodiment an object is tracked based on its shape in the image. The method may include applying a shape detection algorithm on the image to detect a shape of the object and tracking the shape of the object. For example, a selected feature from within the tagged object in one image is tracked in a sequence of images. Shape recognition algorithms are applied at a suspected location of the tagged object in a subsequent image from the sequence of images to detect the object in the subsequent image and a new selected feature from within the detected object is then tracked, thereby providing verification and updating of the location of the tagged object.

Typically, the unique identity of the occupant is not used during tracking, namely, information related to the identity of the occupant is not relied upon for tracking, rather, object parameters (such as image features and/or shape features and/or descriptors as described herein) are used to track the object.

In one embodiment a method for locating an occupant in a space includes receiving an occupant identity signal associated with an object in an image of a space.

Typically, the identity signal includes a signal uniquely associated with the occupant. In one embodiment the identity signal is automatically generated based on identification of the occupant (e.g., based on detection of image features of the object (e.g., a facial feature) by sensor 105). In another embodiment the signal uniquely associated with the occupant is a signal initiated by the occupant (for example by using an RF ID or other methods described above).

In one embodiment images of the space include images obtained from a plurality of differently positioned cameras. The tracking of a tagged object may be assisted by the communication between the plurality of cameras. If, for example, a tagged object is known to be moving in the FOV of a first imager in a direction of a FOV of a second imager then this information can add to the certainty of the second imager that the object detected by the second imager is the tagged object.

Figure 3:
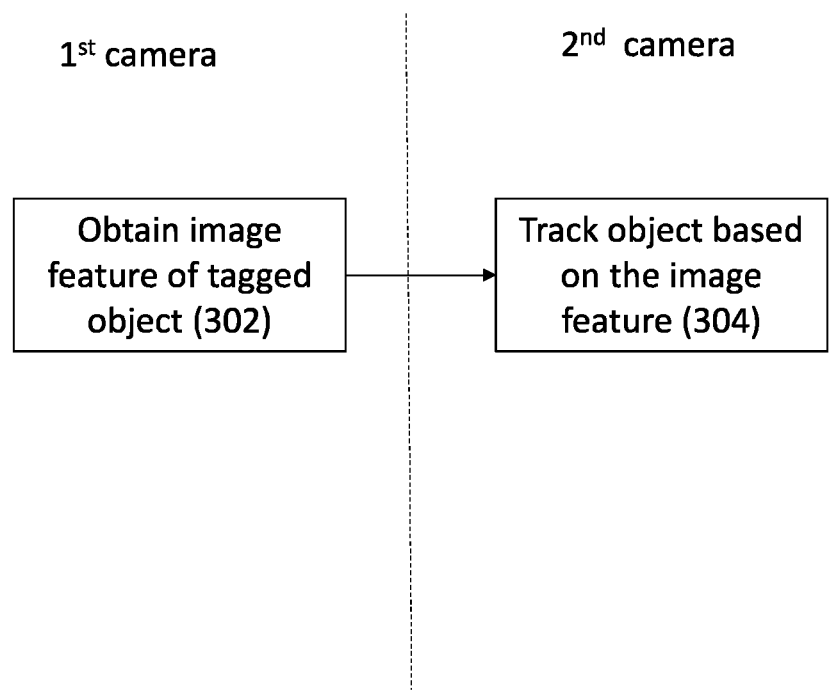
FIG. 3 is a schematic illustration of a method for tracking an occupant in a space, according to embodiments of the invention.

In one example, which is schematically illustrated in FIG. 3, the method includes obtaining an image feature of the object in an image obtained from a first camera (302) and tracking the object in images obtained from a second camera (304) based on the image feature of the object in the image obtained from the first camera.

The image feature may include, for example, a direction of the object or a descriptor (e.g., including an appearance characteristic) of the object.

Figure 4:
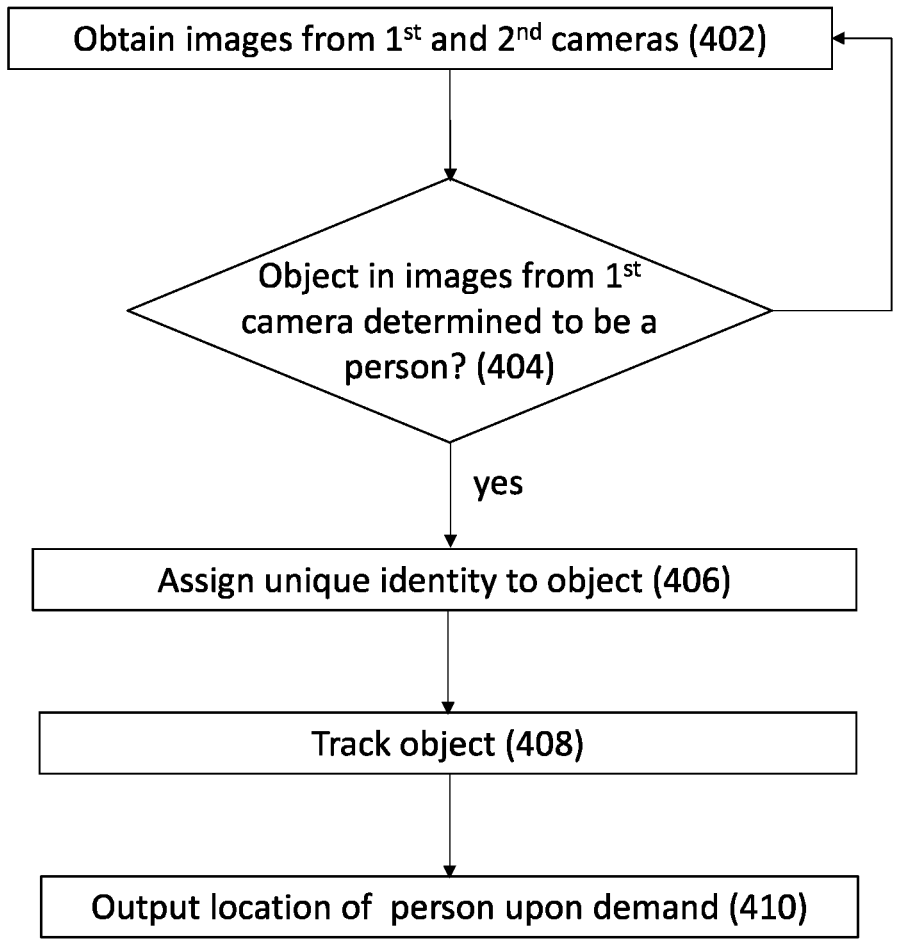
FIG. 4 is a schematic illustration of a method for locating a person within a space, according to an embodiment of the invention.

Thus, in one embodiment, which is schematically illustrated in FIG. 4, a method for locating a person within a space may include obtaining images of the space from first and second cameras (402). Once an object detected in an image obtained from the first camera is determined to be an occupant (e.g., a person) (404) a unique identity is assigned to the object (406), e.g., as described above. The object is then tracked based on a feature associated with the object such as an appearance characteristic or based on another feature associated with the object, which cannot be used to reconstruct an image (e.g., based on direction information of the object) (408). For example, an appearance characteristic may be selected from within the object and may be tracked (e.g., as described above). The object is thus tracked throughout images obtained from the first camera and the second camera. The person may be located within the space (e.g., upon demand) based on the tracking and based on the unique identity that was assigned to the object. For example, the location (present and/or past locations) of the persons may be output (410) upon demand. Thus, according to embodiments of the invention a trajectory of the person in the space (which includes present and/or past locations) may be provided upon demand.

Embodiments of the invention enable locating a particular occupant in a space, however, without transmitting (thereby possibly exposing) images of the space.

Figure 5A:
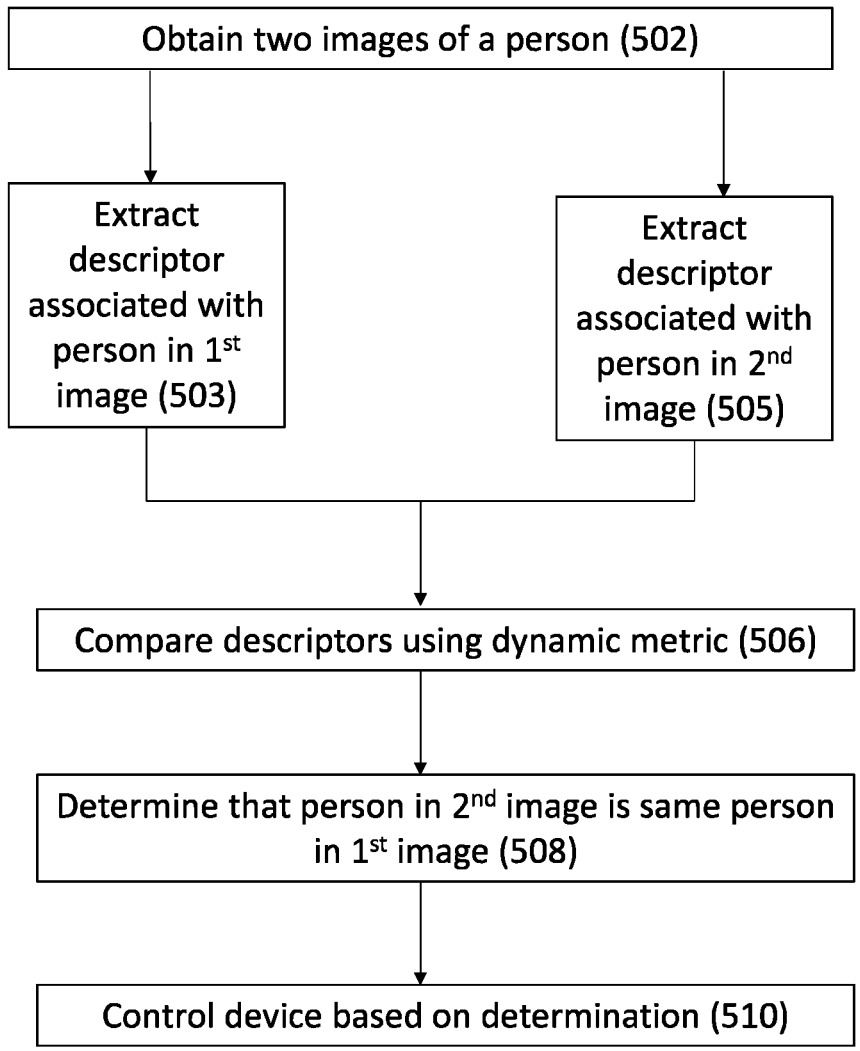
FIG. 5A is a schematic illustration of a method for determining if a person is the same person in two different images, to enable locating and tracking the person, according to embodiments of the invention.

In one embodiment, which is schematically illustrated in FIG. 5A, processor 102 obtains two images of a person (or any object) (502) and extracts a descriptor associated with the person in the first image (503) and a descriptor associated with the person in the second image (505). The two images may be images obtained from a single camera 103 or from two different cameras, e.g., a first image may be captured by a first camera 103a and the second image may be captured by a second camera 103b. Each of the two cameras may be differently located to obtain image data from a different portion of the space.

The descriptors may include one or more characteristics of a person (or any object), such as, size, shape (e.g., size and/or shape of a bounding shape surrounding the person, appearance (such as texture, color information, such as brightness, saturation and hue), location (x and/or y location), etc. Location of an object in the image may include a location within the frame of the image and/or a real-world location. A location of the object in the frame of the image may be determined, e.g., by processor 102, using known methods and the location in the image may then be transformed to a real-world location by using, for example, projective geometry. The location may be represented as a coordinate or other location representation.

The descriptors may include a statistical representation of the one or more characteristics, such as an average value of characteristics, a median value of characteristics, etc.

The descriptors associated with the person in a first image and/or second image may be saved (e.g., in a database) such that the descriptors may be compared, using a dynamic metric (506). Processor 102 thus determines, using the dynamic metric, if the person in the second image is a same person in the first image (508), based on the comparison.

Determining that a person in two different images is the same person can be used to control a device (510) in several applications.

Figure 5B:
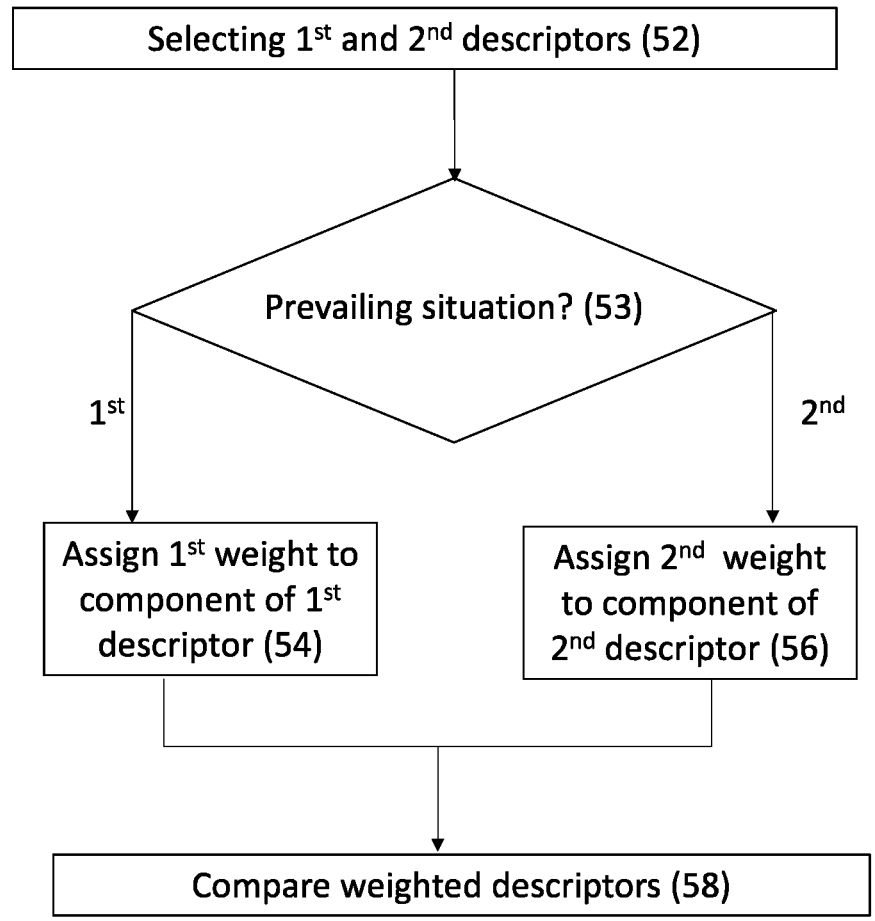
FIG. 5B schematically illustrates an example of a dynamic metric, according to embodiments of the invention.

The dynamic metric changes based on a prevailing situation. An example of a dynamic metric, which is schematically illustrated in FIG. 5B, includes an algorithm to measure the difference (e.g., distance) between two descriptors. For example, the algorithm may use statistical techniques, such as a z-score.

The algorithm may assign different weights to different components of the descriptors, in different situations. As exemplified by following first and second images captured in a specific situation, descriptors associated with objects in the two different images may be selected (e.g., from a database where they are saved) (52) to be compared. The situation or factors related to the two images are assessed (53). Based on the prevailing situation, either a first weight is assigned to a component of the descriptors (54) or a second weight is assigned to the component of the descriptors (56). The weighted descriptors are then compared (58) to determine if the object in the first image is the same as the object in the second image.

By using different weights in different situations, the metric may dynamically adjust to the different situations. Typically, the different situations are unrelated to the descriptor. Thus, the dynamic metric may assign a weight to a component of the descriptor based on a factor that is unrelated to the descriptor.

For example, a prevailing situation or factor may include the capture time of each of the first and second images, namely, a time difference between capturing of the first image and capturing of the second image. The dynamic metric may assign a higher weight to a component of a descriptor, such as location of a person, in two images captured within a small time difference (e.g., in two immediately consecutive images) than to the location of a person in two images captured within a larger time difference. Thus, in one example, the dynamic metric assigns a weight to the location of the person in each of the first and second images in inverse proportion to the time difference between capturing of the first image and capturing of the second image.

In another example, the prevailing situation or factor, based on which weights are assigned to components of the descriptor, may be the identity of the camera capturing the first and second image. Thus, for example, the dynamic metric may assign a higher weight to a component of a descriptor, such as the location of the person and/or shape and/or size of the person, in two images captured by the same camera, than in two images captured by differently located cameras.

In another example, a prevailing situation or factor, based on which weights are assigned to components of the descriptor, may include the variability of appearance of the person in one (or one sequence) of the images, over time. Thus, if the variability of appearance of a person (or other object) in a first set of images is high (e.g., a same person shows different texture and/or color information even in immediately consecutive images), the weight assigned to an appearance component of the descriptor may be lower than the weight assigned to the appearance component of a descriptor associated with a person that does not show a large variability in appearance. Thus, the dynamic metric may assign a weight to the appearance of the person in inverse proportion to the variability of appearance of the person in a first image or first sequence of images, over time.

Embodiments of the invention enable accurate determination that a person in two different images is the same person. This determination can be used to control a device, e.g., to output a location of a specific occupant upon demand (also retroactively, as described herein), to provide a trajectory in the space of the person and more.

Embodiments of the invention may be used in various applications. For example, security uses of embodiments of the invention may include identifying locations visited by particular people. If a security breach is detected at a particular location in the space embodiments of the invention enable identifying all persons accessing the particular location. In another example, a seating plan may be automatically generated by detecting the locations of all sitting identified occupants and reporting the location in space of each particular occupant. In another example location coordinates of a predetermined area in a space (e.g., a restricted area) can be compared to location coordinates of a particular occupant to detect unauthorized visits of the particular occupant to the restricted area.

What is claimed is:

1. A method for locating a person in a space, the method comprising obtaining a first image of a person and a second image of a person;

comparing a descriptor of the person in the first image to a descriptor of the person in the second image;

using a dynamic metric that changes based on a prevailing situation, to determine that the person in the second image is a same person in the first image, based on the comparison.

2. The method of claim 1 wherein the descriptor comprises one or a combination of components selected from: location of the person, size of the person and shape of the person.

3. The method of claim 1 wherein the descriptor comprises more than one component.

4. The method of claim 1 wherein the dynamic metric assigns a weight to a component of the descriptor based on a factor that is unrelated to the descriptor.

5. The method of claim 4 wherein the factor comprises a time difference between capturing of the first image and capturing of the second image.

6. The method of claim 5 wherein the component of the descriptor comprises a location of the person and wherein the dynamic metric assigns a weight to the location of the person in inverse proportion to the time difference between capturing the first image and capturing the second image.

7. The method of claim 1 wherein the dynamic metric assigns a weight to a component of the descriptor based on a variability of appearance of the person in the first image, over time.

8. The method of claim 7 wherein the component of the descriptor comprises an appearance of the person and wherein the dynamic metric assigns a weight to the appearance of the person in inverse proportion to the variability of appearance of the person in the first image, over time.

9. The method of claim 1 comprising assigning a unique identity to the person in the first image and assigning the unique identity retroactively to a person in previously stored images, determined to be the same as the person in the first image.

10. The method of claim 1 wherein the first image is captured by a first camera and the second image is captured by a second camera.

11. The method of claim 10 wherein each of the first and second cameras are configured to obtain image data from a different portion of the space.

12. The method of claim 10 comprising detecting a direction of motion of the person in images obtained from the first camera; and tracking the person in images obtained by the second camera based on the detected direction.

13. The method of claim 10 comprising tracking the person in images obtained by the second camera using the descriptor associated with the person and based on shape features of the person detected in the images obtained by the first camera.

14. The method of claim 1 comprising providing a trajectory in the space of the person from the first image.

15. The method of claim 1 comprising providing a location of the person from the first image, upon demand.

* * * * *